United States Patent [19]
Harrison et al.

[11] Patent Number: 6,051,032
[45] Date of Patent: Apr. 18, 2000

[54] METHOD OF INSTALLING AND CONFIGURING AN APPLICATION PROGRAM WITHIN A COMPUTER SYSTEM, AND APPLICATION PROGRAM FOR FACILITATING THE METHOD

[75] Inventors: Roy B Harrison, Romsey; Michael George Taylor, Southampton, both of United Kingdom

[73] Assignee: International Business Machines Corporation, Armonk, N.Y.

[21] Appl. No.: 08/947,987

[22] Filed: Oct. 9, 1997

[30] Foreign Application Priority Data

May 8, 1997 [GB] United Kingdom .................. 9709381

[51] Int. Cl.[7] ................................................. G06F 9/445
[52] U.S. Cl. .................................. 717/11; 717/6; 717/7; 717/8; 717/9; 717/10
[58] Field of Search ............................. 395/712; 717/11, 717/10, 9, 8, 7, 6

[56] References Cited

U.S. PATENT DOCUMENTS

| | | | |
|---|---|---|---|
| 5,421,009 | 5/1995 | Platt | 395/712 |
| 5,604,906 | 2/1997 | Murphy et al. | 717/11 |
| 5,666,501 | 9/1997 | Jones et al. | 345/348 |
| 5,794,052 | 8/1998 | Harding | 395/712 |
| 5,805,897 | 9/1998 | Glowny | 395/712 |
| 5,835,777 | 11/1998 | Staelin | 395/712 |

FOREIGN PATENT DOCUMENTS

| | | |
|---|---|---|
| 09034723 | 2/1997 | Japan . |
| 09044361 | 2/1997 | Japan . |

OTHER PUBLICATIONS

IBM Technical Disclosure Bulletin, "Architecture for Graphic Easy Software Install Management Interface", vol. 37, No. 12, pp. 509–510, Dec. 1994.
IBM Technical Disclosure Bulletin, "Safe Installation of Object–Oriented Class Libraries Common to Multiple Software Products", vol. 37, No. 2B, pp. 407–410, Feb. 1994.
IBM Technical Disclosure Bulletin, "Software Packaging and Verification Aid", vol. 36, No. 6A, pp. 223–226, Jun. 1993.

*Primary Examiner*—Tariq R. Hafiz
*Assistant Examiner*—Ted T. Vo
*Attorney, Agent, or Firm*—Edward H. Duffield

[57] ABSTRACT

A method of installing and configuring a computer program onto a computer system involves loading a default bundle of objects into the computer system along with configuration data of said objects, including attributes and inter-object relationships. Some of the default bundle of objects are model objects and these, along with their respective attributes and inter-object relationships, are sent to a systems administrator's display screen, where they may be altered. The model objects and the first-mentioned default bundle of objects are then merged together to form the bundle of image objects which represents a working version of the installed computer program.

4 Claims, 3 Drawing Sheets

METHOD OF INSTALLING AND CONFIGURING AN APPLICATION PROGRAM WITHIN A COMPUTER SYSTEM, AND APPLICATION PROGRAM FOR FACILITATING THE METHOD

FIELD OF THE INVENTION

The present invention is in the field of computer systems and more specifically involves installing and configuring an application program within a computer system.

BACKGROUND OF THE INVENTION

Each organization making use of a computer system typically has a person called a systems administrator who looks after the general upkeep of the computer system and is responsible for periodically updating the computer system to make it work better over time. For example, when new applications (software products) are written by outside vendors, and it is decided that one of these applications should be purchased and used within the organization, the system administrator is responsible for taking the necessary steps to install this new application into the organization's computer system.

Applications are usually written with a number of elements left unconfigured so that each systems administrator can modify the application according to the specific needs of the respective computer system and the respective organization when installing the application into the computer system. This gives the administrator a great deal of flexibility in configuring the system.

However, as applications become more and more complex, installing a new application in this way can also present a great deal of difficulty for the systems administrator. For example, when applications are written, as many are today, in the object-oriented programming paradigm, the structure of the application can become quite complex. This latter programming technique is becoming more and more popular because of the tremendous advantages provided thereby (for example, flexible re-use of existing software code). In object oriented programming, an application contains organizational components (e.g. objects), each having certain relationships to other components and each having a large number of attributes used to define the components.

Typically, when writing an object-oriented program, the programmer will try to make the various systems administrators' program installation jobs easier by dividing the application's organizational components into two groups: definitional managed objects (referred to hereinafter as 'model objects') and operational managed objects (referred to hereinafter as 'image objects').

The model objects represent the parts of the application which each systems administrator can configure according to his specific needs. That is, the attributes of the model objects and the relationships between the model objects can be adjusted. The systems administrator is provided with configuration details on his display screen concerning these model objects so that he can adjust the attributes of these objects and the relationships between the objects as he sees fit.

On the other hand the image objects represent the parts of the application which the systems administrator usually cannot change directly. Configuration details of the image objects are thus not usually presented to the systems administrator's display screen. The preset configuration details for the image objects are, instead, sent directly to the computer system bypassing the administrator. The administrator can only alter them by first altering the configuration details of the model objects (which are on his screen) and then the image objects can be altered based on his alteration of the model objects.

The image objects represent the present state of the installed application, including changes made thereto by the systems administrators' configuring of the model objects and the application programmer's preset configurations. Thus, the systems administrator's installation job is made easier as he only sets the configurations of the model objects.

While this separation of organizational components of an object-oriented application into two parts has made it easier for an administrator to install an application, in a large system the allowable permutations of even the model objects can still be extremely complex. Therefore, as these large-scale applications are being sold to organizations, the respective systems administrators are faced with an increasingly difficult task in appropriately setting the object attributes and object relationships while installing a new application. This problem has made it more and more undesirable for organizations to purchase such applications, despite the great advantages they could attain if they were to purchase and install the application.

SUMMARY OF THE INVENTION

According to a first aspect, the present invention provides a method of installing and configuring a computer program onto a computer system, comprising steps of: receiving an instruction to install the computer program within the computer system; and in response to the instruction to install the computer program, loading a default bundle of install objects including attributes for each object and inter-object relationships within the computer system, the default bundle of install objects comprising necessary objects, attributes and inter-object relationships, to provide a working version of the computer program.

Preferably, also in response to the instruction to install the computer program within the computer system, a default bundle of model objects, which is a subset of the default bundle of install objects, along with default attribute values and inter-object relationships for the model objects, is displayed on a systems administrator's display screen. Further, after the default bundle of model objects is displayed on the display screen, a first command is received to accept the default bundle of model objects or a second command is received to modify the default bundle of model objects. Still further, after one of the first or the second command is received, merging the bundle of model objects with the bundle of install objects to provide a bundle of image objects representing an installed version of the computer program. Further, a plurality of the default bundles are loaded in response to said instruction to install the computer program.

According to a second aspect, the invention provides a computer program product stored on a computer readable storage medium, for use in installing and configuring the computer program product on a computer system, the product comprising respective software code portions for performing the steps of the methods described above.

Accordingly, the present invention shifts the burden of understanding the complex configuration from the system administrator to the application programmer. The burden is better placed with the application programmer, as he need only do the job once, and the potentially large number of administrators (perhaps in the thousands if many copies of the program are sold) will have a much easier time configuring their respective computer systems at install time.

This makes it much more desirable for organizations to consider purchasing large scale applications, as they can be sure that the application can be quickly and easily installed.

BRIEF DESCRIPTION OF THE DRAWINGS

The invention will now be described, by way of example only, with reference to the accompanying drawings, in which.

DETAILED DESCRIPTION OF THE PREFERRED EMBODIMENTS

In a first preferred embodiment of the present invention the application programmer provides a group of objects known as install objects, where the programmer describes a combination (bundle) of image objects required to achieve a working application. In the past, the programmer provided model objects which were, in essence, certain objects (the ones that the programmer allowed the administrator to alter) with attribute values for objects and relationships amongst objects not set. with the invention, the programmer provides, instead, a bundle of install objects with default attribute values for the objects and relationships amongst them already set in such a way that a working application results when the application is installed.

For example (see FIG. 1), an application 1 is written so that it uses three working objects A, B and C (11A, 11B and 11C, respectively) when it is installed and run on a computer system. It should be clearly noted that this example presents a greatly simplified application having only three objects. Usually, a large network of objects would be involved. This simplified example has been chosen to enable a clearer description and understanding of the present invention.

Figure 1:
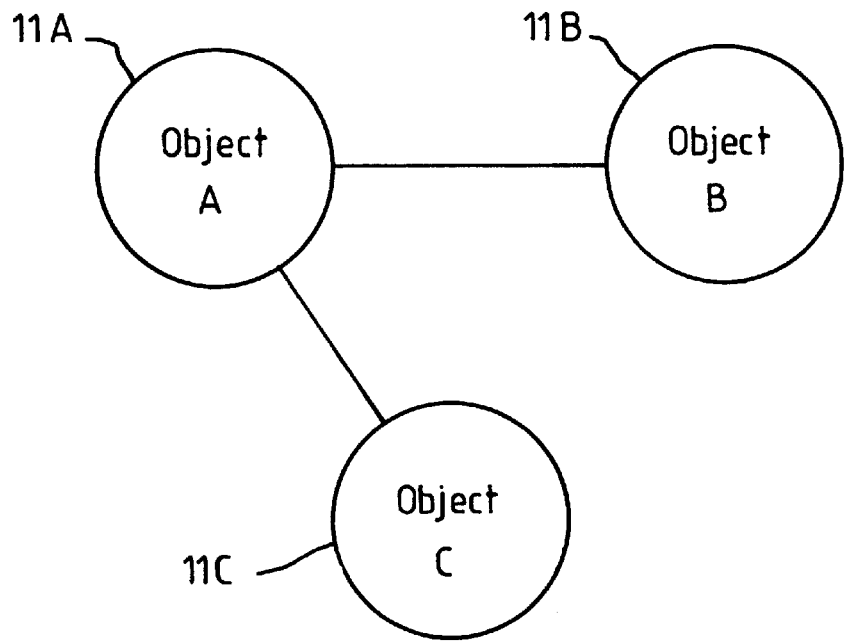
FIG. 1 shows a network of install objects of an object-oriented application program in the context of which a preferred embodiment of the invention can be applied.

The programmer chooses the attribute values of these objects and the relationships between the objects and sets them before shipping the program to the systems administrators. As shown in FIG. 1 by the connecting lines, objects A and B have a direct relationship (e.g. parent and child) as do objects A and C. However, objects B and C do not have such a relationship. Objects A and B are model objects and thus configuration details thereof may be altered from the default settings chosen by the application programmer. Object C is not a model object and thus cannot be so altered.

Figure 2:
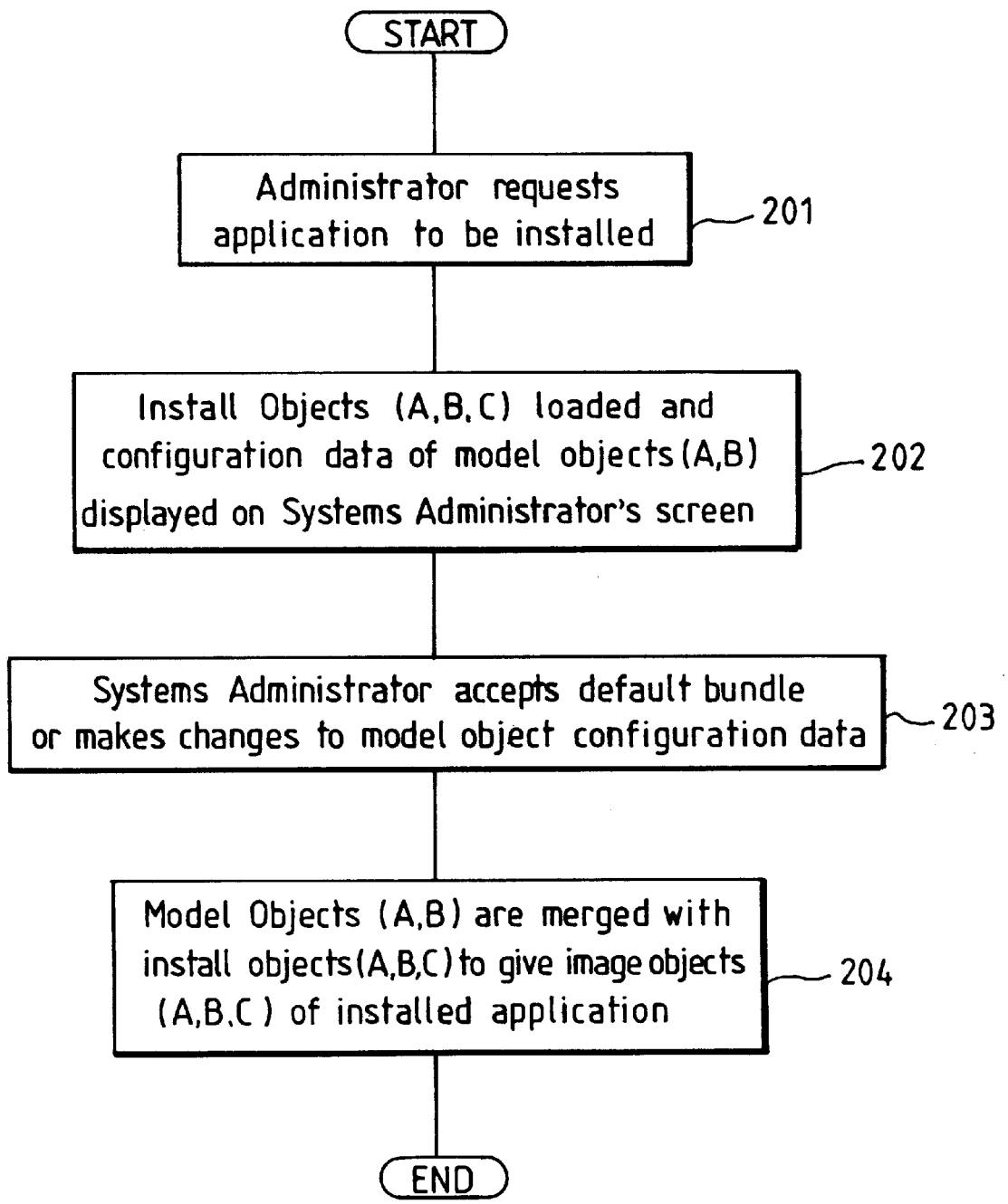
FIG. 2 is a flowchart of an application installation method according to a preferred embodiment.

Upon receiving the application, the system administrator first requests that this application 1 be installed onto a node of his organization's computer system (step 201 in FIG. 2). This loads (step 202) the install objects {A, B, C} into the computer system (e.g. in the systems management agent thereof), and the configuration data of the model objects {A, B} are displayed on the systems administrator's screen. At step 203, the administrator views the model objects {A, B} on his display screen (3 in FIG. 3) and either accepts them, along with their respective sets of default attribute values and object relationships, or makes any changes to the default attributes or relationships. That is, the administrator may have some experience with these types of objects and can study the default values to do a double check on the programmer to see if the objects will do the specific job required in the context of the respective computer system.

Figure 3:
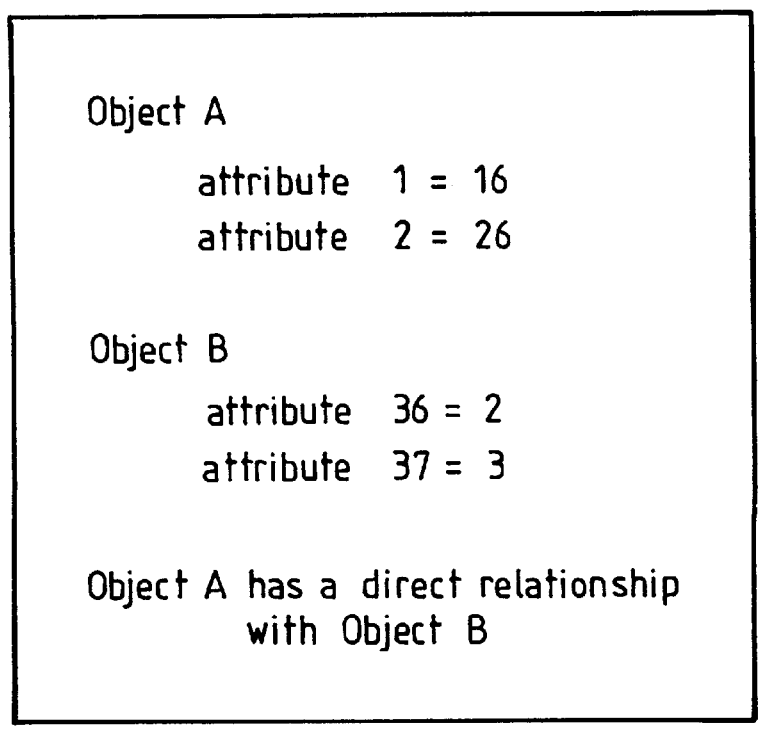
FIG. 3 shows a system administrator's display screen when an application installation method according to the first preferred embodiment is carried out.

In the example of FIG. 3, the default bundle of preset configuration details for the model objects A and B are as follows. Object A has two attributes: "attribute 1" with a preset value of "16" and "attribute 2" with a preset value of "26". Object B has two attributes: "attribute 36" and "attribute 37" with preset values of "2" and "3" respectively. Object A has a direct relationship with Object B and this is clearly indicated on the administrator's screen.

Then, the model objects {A, B} and install objects {A, B, C} are merged (step 204), to form the image objects {A, B, C} thus completing the installation of the application and the corresponding configuration for that node of the computer system.

According to a second embodiment, the administrator is provided with at least one extra default bundle of attributes of and relations amongst the objects, thus providing more choice than in the first embodiment. The programmer provides several possible sets of install objects, each of which are valid combinations for a working application. For example, the programmer knows that the sets {A, B, C} and {A, B, D, E} of install objects are valid but that no other sets would be valid for a particular application. Thus, the programmer sets default attribute values for each install object and default relationships amongst the objects in the two sets (option 1 and option 2, respectively) before the application is shipped.

Figure 4:
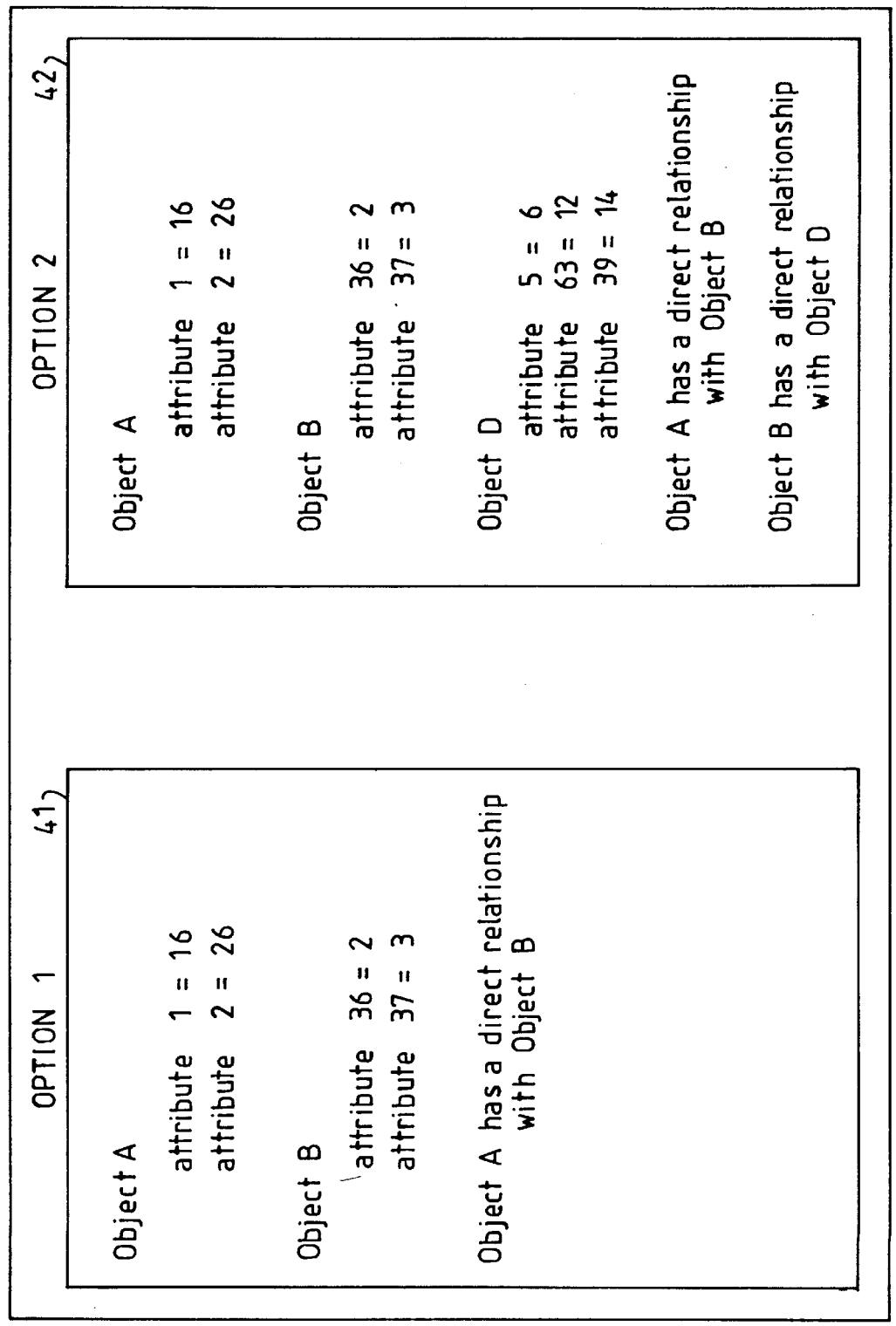
FIG. 4 shows a system administrator's display screen when an application installation method according to a second preferred embodiment is carried out.

At step 203 where the administrator views the install objects, his screen (4 in FIG. 4) would display the model object configuration data of one set 41 (option 1) of install objects and that of a second set 42 (option 2) of install objects. The administrator is then able to choose either option 1 or option 2 when activating the application on the node. In option 2, objects A, B and D are model objects and thus the configuration data thereof appear on the administrator's screen 4 of FIG. 4. The image objects are then automatically created by merging the chosen groups of model objects with the respective group of install objects to form the network of image objects forming the installed application.

The administrator can, therefore, simply make the choice of option 1 or option 2, and thus be totally shielded from the complexities of realizing that these two options (with their associated list of attributes for each object and inter-object relationships) are the only two that will provide a valid application, thus being able to quickly and easily install the application.

We claim:

1. A method of installing and configuring a computer program onto a computer system, comprising steps of:

receiving an instruction to install the computer program within said computer system; and in response to said instruction to install the computer program, loading a default bundle of install objects of said computer program including attributes for each object and inter-object relationships within said computer system, said default bundle of install objects comprising necessary objects, attributes and inter-object relationships, to provide a working version of said computer program, wherein, also in response to said instruction to install the computer program within the computer system, a default bundle of model objects, which is a subset of said default bundle of install objects, along with default attribute values and inter-object relationships for said model objects, is displayed on a systems administrator's display screen; and after said default bundle of model objects is displayed on said display screen, a first command is received to accept the default bundle of model objects or a second command is received to modify the default bundle of model objects; and after one of said first or said second commands is received, said bundle of model objects is mergered with said bundle of install objects to provide a bundle of image objects representing an installed version of said computer program.

2. The method of claim 1 wherein a plurality of said default bundles are loaded in response to said instruction to install the computer program.

3. A computer program product stored on a computer readable storage medium, for use in installing an configuring said computer program product on a computer system, said product comprising respective software code portions for performing steps of:

receiving an instruction to install the computer program within said computer system; and in response to said instruction to install the computer program, loading a default bundle of install objects of said computer program including attributes for each object and inter-object relationships within said computer system, said default bundle of install objects comprising necessary objects, attributes and inter-object relationships, to provide a working version of said computer program, wherein, also in response to said instruction to install the computer program within the computer system, a default bundle of model objects, which is a subset of said default bundle of install objects, along with default attribute values and inter-object relationships for said model objects, is displayed on a systems administrator's display screen; and after said default bundle of model objects is displayed on said display screen, a first command is received to accept the default bundle of model objects or a second command is received to modify the default bundle of model objects; and after one of said first or said second commands is received, said bundle of model objects is merged with said bundle of install objects to provide a bundle of image objects representing an installed version of said computer program product.

4. The computer program product of claim 3 wherein a plurality of said default bundles are loaded in response to said instruction to install the computer program product.

* * * * *